United States Patent
Newton et al.

(10) Patent No.: US 11,341,452 B2
(45) Date of Patent: May 24, 2022

(54) METHOD AND APPARATUS FOR PROVIDING SECURE DELIVERY

(71) Applicant: AT&T Intellectual Property I, L.P., Atlanta, GA (US)

(72) Inventors: Donald Newton, Flowery Branch, GA (US); Michael Zadig, Johns Creek, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 603 days.

(21) Appl. No.: 14/569,215

(22) Filed: Dec. 12, 2014

(65) Prior Publication Data
US 2016/0171435 A1    Jun. 16, 2016

(51) Int. Cl.
*G06Q 10/08*    (2012.01)
*H04N 1/00*    (2006.01)

(52) U.S. Cl.
CPC ..... *G06Q 10/0833* (2013.01); *H04N 1/00116* (2013.01); *H04N 2201/0084* (2013.01)

(58) Field of Classification Search
CPC .......................... G06Q 10/0833; G06Q 10/083
USPC ........................................................ 705/333
See application file for complete search history.

(56) References Cited

U.S. PATENT DOCUMENTS

| | | | |
|---|---|---|---|
| 6,300,873 B1 * | 10/2001 | Kucharczyk | A47G 29/141 |
| | | | 235/382.5 |
| 6,882,269 B2 | 4/2005 | Moreno | |
| 6,999,825 B2 | 2/2006 | Inomata | |
| 7,193,503 B2 | 3/2007 | Fisher | |
| 7,693,745 B1 | 4/2010 | Pomerantz et al. | |
| 7,714,708 B2 | 5/2010 | Brackmann et al. | |
| 7,903,846 B2 | 3/2011 | Fisher | |
| 8,401,932 B2 | 3/2013 | Levy | |
| 8,451,088 B2 | 5/2013 | Fisher | |
| 8,593,252 B2 | 11/2013 | Fisher | |
| 8,892,457 B2 | 11/2014 | Laskowski et al. | |
| 10,482,420 B1 * | 11/2019 | Brooks | G06Q 10/0836 |
| 2001/0045449 A1 | 11/2001 | Shannon | |
| 2001/0050615 A1 * | 12/2001 | Kucharczyk | A47G 29/141 |
| | | | 340/568.1 |
| 2002/0035515 A1 * | 3/2002 | Moreno | A47G 29/141 |
| | | | 340/5.73 |

(Continued)

FOREIGN PATENT DOCUMENTS

| | | | | |
|---|---|---|---|---|
| EP | 1456794 B1 | 2/2013 | | |
| EP | 2835078 A1 * | 2/2015 | ......... | A47G 29/1245 |

(Continued)

OTHER PUBLICATIONS

"Network-enabled Secure Unsupervised Parcel Storage." Mar. 6, 2009. The ip.com Journal, IPCOM000180309D. https://priorart.ip.com/IPCOM/000180309. (Year: 2009).*

(Continued)

*Primary Examiner* — Jeff Zimmerman
*Assistant Examiner* — Hunter A Molnar

(57) ABSTRACT

A method, computer-readable medium and apparatus for receiving a package are disclosed. For example, the method via a processor receives an indication that the package is to be placed into a delivery box, captures an image of the delivery of the package, and sends a confirmation that the package has been placed into the delivery box.

15 Claims, 4 Drawing Sheets

(56) References Cited

U.S. PATENT DOCUMENTS

| | | | |
|---|---|---|---|
| 2002/0072983 A1* | 6/2002 | Teller | G06Q 20/12 705/26.4 |
| 2002/0147919 A1 | 10/2002 | Gentry | |
| 2002/0156645 A1* | 10/2002 | Hansen | G06Q 10/08 705/333 |
| 2003/0023870 A1* | 1/2003 | Geros | A47G 29/141 726/27 |
| 2003/0040980 A1* | 2/2003 | Nakajima | G06Q 10/08 705/26.8 |
| 2003/0097287 A1* | 5/2003 | Franz | G06Q 10/08 705/28 |
| 2003/0114206 A1 | 6/2003 | Timothy et al. | |
| 2004/0025039 A1 | 2/2004 | Kuenzi et al. | |
| 2004/0252017 A1 | 12/2004 | Holding et al. | |
| 2005/0068178 A1* | 3/2005 | Lee | G07F 17/12 340/569 |
| 2006/0020366 A1* | 1/2006 | Bloom | B07C 3/00 700/226 |
| 2007/0266081 A1* | 11/2007 | Murchison | G07C 9/00571 709/203 |
| 2012/0130916 A1* | 5/2012 | Neal | G06Q 10/08 705/339 |
| 2013/0088323 A1* | 4/2013 | Ryan | G06Q 10/08 340/5.7 |
| 2013/0261792 A1* | 10/2013 | Gupta | G06Q 10/08 700/232 |
| 2013/0328661 A1* | 12/2013 | Phillips | G06K 9/00771 340/5.7 |
| 2015/0186840 A1* | 7/2015 | Torres | A47B 81/00 705/339 |
| 2015/0235173 A1* | 8/2015 | Hall | G07C 9/00571 705/339 |
| 2016/0027261 A1* | 1/2016 | Motoyama | G08B 5/36 340/313 |
| 2016/0117934 A1* | 4/2016 | Soundararajan | G01S 1/44 701/3 |
| 2016/0374494 A1* | 12/2016 | Geng | A47G 29/141 232/17 |

FOREIGN PATENT DOCUMENTS

| | | |
|---|---|---|
| JP | H 0352094 A | 3/1991 |
| JP | H 05113066 A | 5/1993 |
| JP | H 09330458 A | 12/1997 |
| JP | H 1118916 A | 1/1999 |
| WO | WO 0178022 A1 | 10/2001 |
| WO | WO 2014144628 A2 | 9/2014 |
| WO | WO-2014184332 A1 * 11/2014 ............. G07F 17/10 |

OTHER PUBLICATIONS

Brett Ferrand, Mark Xu, Martyn Roberts, "Unattended Delivery of Online shopping: An Exploratory Study form Consumers Perspectives," Portsmouth Business School, University of Portsmouth, Portsmouth, UK. PO1 3DE. Disclosing unattended merchandise delivery secured options including home security access systems, fitted integrated box, workplace collection, use of existing outlets and mechanized storage and retrieval devices (p. 31). 2006, pp. 1-5.

"Unattended Delivery," TForce integrated solutions.http://www.tforce-solutions.com/en/core_unattended_delivery.aspx. Disclosing delivery to unattended facilities after-hours with remote-or time-released boxes. Downloaded Dec. 2, 2014.

"ParcelPal Unattended Delivery Product/Service," Facebook. Disclosing delivery into secured containers (the photos on the 1$^{st}$ Page). Nov. 17, 2011, 1pg.

"Peapod," Smartphone app, iTunes, Peapod, LLC. Discloses coordinating grocery deliveries to accessable refrigerator through iPhone. Dec. 18, 2012, 2 pages.

"Lily Unattended Overnight Delivery service," lily®, Genuine Parts Company, NAPA. Discloses delivery to merchant after-hours, unattended in secure containers. Downloaded from http://www.lily.com/services/unattended-overnight-delivery. Dec. 2, 2014.

* cited by examiner

METHOD AND APPARATUS FOR PROVIDING SECURE DELIVERY

The present disclosure relates generally to secure delivery and, more particularly, to a method, computer readable medium, and system for ensuring the secure delivery of a package and the ability to verify that the secure delivery of the package has occurred.

BACKGROUND

As commerce continues to proliferate, especially Internet commerce, an ever increasing amount of commerce involves the delivery of products as packages to homeowners who are often unavailable to receive the packages in person due to obligations such as work. Even if the residence is generally occupied throughout the day, it is impractical for the occupant(s) of the residence to avail themselves to the deliveries of packages that may occur any time ranging from 8:00 am to 8:00 pm. Thus, packages (especially large packages that do not fit in a mailbox) are often left at the door of the residence.

Unfortunately, such delivery practices allow thieves to exploit this vulnerability, especially during the holiday seasons where a large number of packages (often expensive gifts) are being delivered. Thieves can simply follow a delivery truck and communicate the locations to their accomplices where large packages are being left unattended at the door of residences.

Furthermore, thefts may also occur where a delivery service personnel (e.g., a deliveryman) may allege that a package was delivered to a residence, but when in fact, the delivery service personnel may have delivered the package to an accomplice's home instead. Furthermore, even the home owners may potentially be thieves. For example, a home owner finding a package being left at the door may then complain to the retailer or vendor that the package never arrived. Such thefts quickly amount to a very large monetary loss to the retailers or vendors, insurance companies and/or product delivery service companies.

SUMMARY

In one embodiment, the present disclosure provides a method, computer-readable medium, and apparatus for receiving a package. In one embodiment, the method via a processor receives an indication that the package is to be placed into a delivery box, captures an image of the delivery of the package, and sends a confirmation that the package has been placed into the delivery box.

In one embodiment, the present disclosure provides a method, computer-readable medium, and apparatus for monitoring a delivery of a package. In one embodiment, the method via a processor receives a first notification of the delivery of the package associated with a subscriber from a retailer, receives a second notification from a delivery service of a delivery schedule of the package, sends a third notification comprising the delivery schedule to a delivery box associated with the subscriber, and receives a confirmation from the delivery box that the package has been placed into the delivery box.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to ensuring the secure delivery of a package and the ability to verify that the secure delivery of the package has occurred. As discussed above, delivery practices where packages left at the door of residences are providing thieves with opportunities to steal packages at great loss to the retailers or vendors, insurance companies and/or product delivery service companies.

One embodiment of the present disclosure provides a secure delivery box (broadly a container) that is deployed at the customer premises, e.g., a standalone house, a row house, a condominium, an apartment, a residence hall at a college, and so on. In one embodiment, the secure delivery box can be a standalone container that is located on the customer premises, but is not part of the customer's residence. Alternatively, in one embodiment, the secure delivery box can be deployed within the customer's residence, e.g., the secure delivery box can be integrated into a garage of the customer's residence with an access door for receiving the packages. In one embodiment, the secure delivery box employs a processor and one or more input/output devices such as an image capturing device (e.g., a camera, a scanner, a bar code scanner, a QR code scanner, and the like), a communication device (e.g., an air card, an Ethernet card, a modem, a transmitter, a receiver and/or a transceiver), a display (e.g., a touch screen display), a memory, a storage device such as a disk drive or an optical drive, and/or one or more buttons (e.g., an open button to trigger the opening of an access door to allow a package to be placed into the secure delivery box. It should be noted that this is not an exhaustive list of input/output devices.

In one embodiment, the secure delivery box may have communication capabilities, e.g., the ability for the secure delivery box to communicate with the customer if the customer is not at home, the ability for the secure delivery box to communicate with the retailer or vendor to receive information pertaining to the package that is being delivered and/or to provide information back to the retailer or vendor that the package was indeed received. The communication capabilities may involve wireless communications (e.g., accessing a wireless network such as a cellular network, a Wireless Fidelity (Wi-Fi) network, a wireless local area network (LAN) and the like) or wired communications, e.g., accessing a telecommunication land line such as a phone line or an Ethernet line to access a LAN or a cable network set top box. The functions of the secure delivery box will be described further below in greater details.

Figure 1:
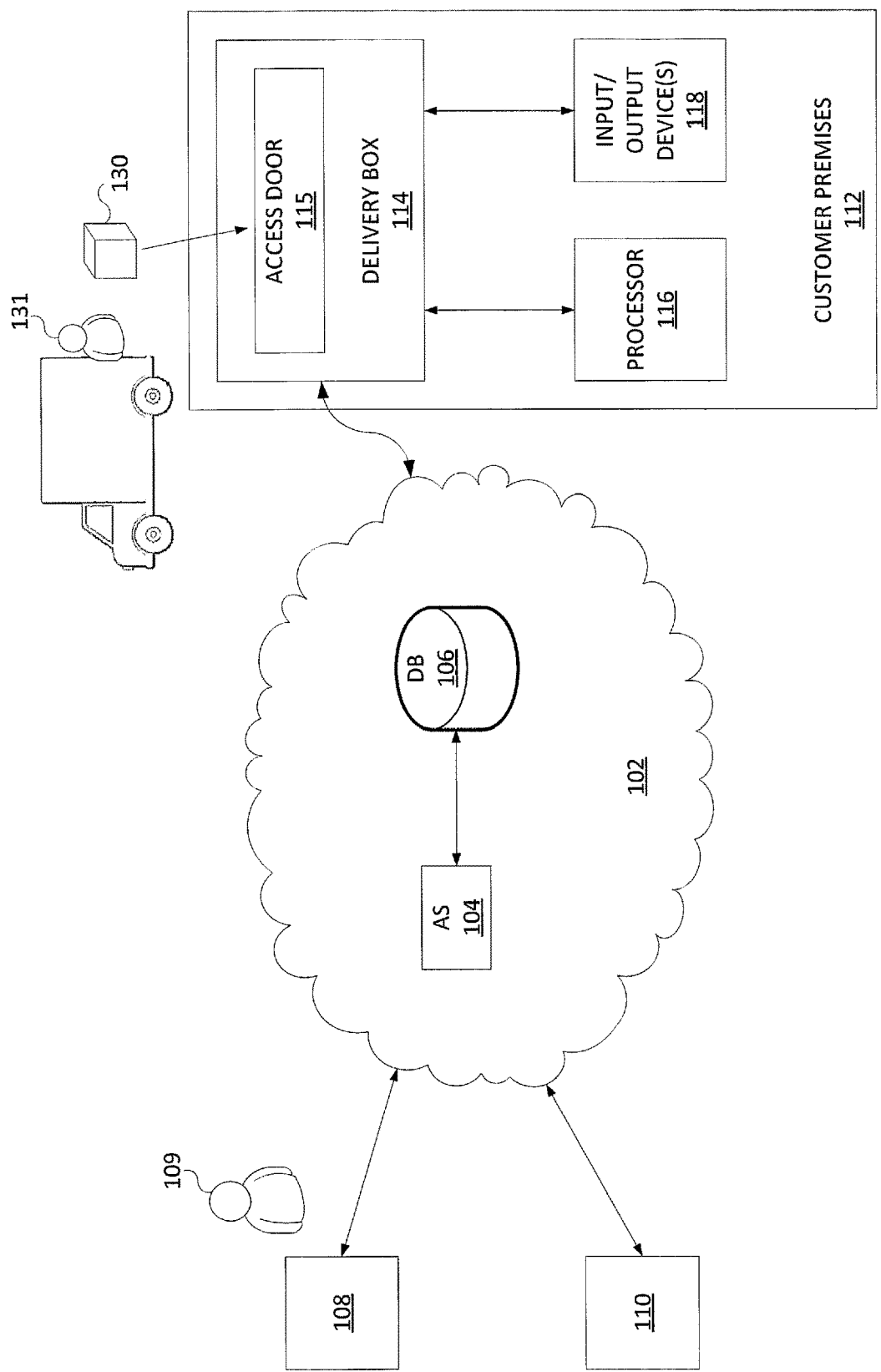
FIG. 1 illustrates one example of a communications network of the present disclosure.

FIG. 1 illustrates an example communication network 100 of the present disclosure. In one embodiment, the communication network 100 may include a core network 102. In one embodiment, the core network 102 may be an Internet Protocol (IP) based communication network operated by a service provider. However, it should be noted that any type of core networks and/or access networks are within the scope of the present invention, e.g., cellular networks, wireless networks such as Wi-Fi networks, cable networks, optical networks, local area networks, and the like.

In one embodiment, the core network 102 may include an application server (AS) 104 and a database (DB) 106. In one embodiment, the AS 104 may be deployed as a dedicated computer illustrated in FIG. 4 and described below and may perform the operations discussed herein.

In one embodiment, the DB 106 may store various information disclosed herein. For example, the DB 106 may store data associated with customers or subscribers of the network service provider. For example, the DB 106 may store preferences or profiles of subscribers of various services provided by the network service provider of the core network 102. In one embodiment, the network service provider may provide a delivery notification service to a subscriber and the preferences or profiles of subscribers may entail how the packages will be received at the subscribers' residence, how the subscribers will be notified when a package is delivered, and so on.

In one embodiment, a subscriber may purchase a product (e.g., online or via a physical store) from a retailer, merchant or vendor where the product will be delivered as a package to the residence of the subscriber. The subscriber may have a service where the network service provider of the core network 102 will act on behalf of the subscriber in interacting with the merchant and a secure delivery box of the subscriber. For example, the network service provider will monitor the delivery of the package to the secure delivery box and, in turn, will provide a notification to the subscriber when the package has been placed in the secure delivery box. This allows the subscriber to utilize the network service provider as a third party manager between the retailer and the subscriber for handling package deliveries. For example, the subscriber may already have a home service with the network service provider that may be tasked with providing home security services (e.g., operating a security system or function, operating a fire detection or suppression system or function, and the like) and/or home automation services (e.g., operating a heating/cooling (HVAC) system or function, operating lightings within the residence, operating (e.g., opening or closing) locks on doors and windows of the residence, and so on). As such, the delivery notification service can be an additional service that is a component of an overall home service provided by the network service provider.

Although FIG. 1 illustrates the core network 102 only having a single AS 104 and a single DB 106, it should be noted that any number of application servers and databases may be deployed. In addition, it should be noted that core network 102 may include additional network elements not shown, such as for example, border elements, gateways, routers, switches, firewalls, one or more access networks, and the like.

In one embodiment, one or more retailers, merchants or vendors (herein referred generically as a retailer) 110 having hardware systems, e.g., one or more application servers for taking online orders, are in communication with the core network 102. In one embodiment, the retailer may have multiple different locations, e.g., an online presence and/or one or more physical stores. Although a single retailer 110 is illustrated in FIG. 1, it should be noted that any number of retailers may be deployed.

In one embodiment, the retailer 110 may be an entity that sells a product to customers, e.g., a subscriber of a network service provider of the core network 102. However, the customers may also include individuals who are not subscribers of the network service provider of the core network 102.

FIG. 1 illustrates a customer 109 who utilizes an endpoint device 108 to access the core network 102 to perform various functions. The endpoint device can be a wired device, e.g., a desktop computer, or a mobile device, e.g., a cellular telephone, a smart phone, a tablet computing device, a laptop computer, a pair of computing glasses, a wireless enabled wristwatch, or any other wireless-capable mobile telephony and computing device. In one embodiment, the customer 109 utilizes the endpoint device 108 to make a purchase with a retailer, thereby causing the delivery of a package to the customer's residence 112. In another embodiment, the customer 109 utilizes the endpoint device 108 to receive a notification that the delivery of the package is pending and/or has occurred, i.e., placed inside a secure delivery box 114.

In one embodiment, the secure delivery box 114 comprises a secure housing or enclosure, e.g., made from a hardened material such as metal, cement or plastic. The secure delivery box 114 may have one or more access doors 115 to allow one or more packages to be inserted and/or removed from the secure delivery box 114. In one embodiment, the secure delivery box 114 is secured to the customer premises, e.g., via bolts or masonry. The present disclosure is not limited to any particular structures of the secure delivery box 114.

FIG. 1 illustrates a customer's residence or premises 112 having a secure delivery box 114. Although FIG. 1 illustrates the secure delivery box 114 in one embodiment as being deployed inside of the customer's residence 112, e.g., inside a garage of the residence 112 with an access door accessible from the outside for receiving a package 130 delivered by a deliveryman 131, the secure delivery box 114 can be deployed as a standalone unit that is external to the customer's residence 112. In fact, if the customer premises 112 comprises a much larger housing complex, e.g., an apartment building or a university residence hall, then the secure delivery box 114 may comprise a plurality of secure delivery boxes (e.g., one box for each residence within the housing complex, or each box is shared among a subset of the residences).

In one embodiment, the delivery box 114 employs a hardware processor or a controller 116 and one or more input and/or output devices 118. The input/output devices 118 may comprise an image capturing device (e.g., a camera, a video camera, a scanner, a bar code scanner, a QR code scanner, and the like), a communication device (e.g., an air card, an Ethernet card, a modem, a transmitter, a receiver and/or a transceiver), a display (e.g., a touch screen display), a memory (e.g., volatile memory or non-volatile memory), a storage device such as a disk drive, a magnetic drive or an optical drive, and/or one or more buttons (e.g., an open button to trigger the opening of an access door to allow a package to be placed into the secure delivery box, a scan button to trigger a scanner to capture a bar or QR code on the package, and the like). The functions performed by the delivery box 114 will be described below in accordance with FIGS. 2 and 3.

Figure 2:
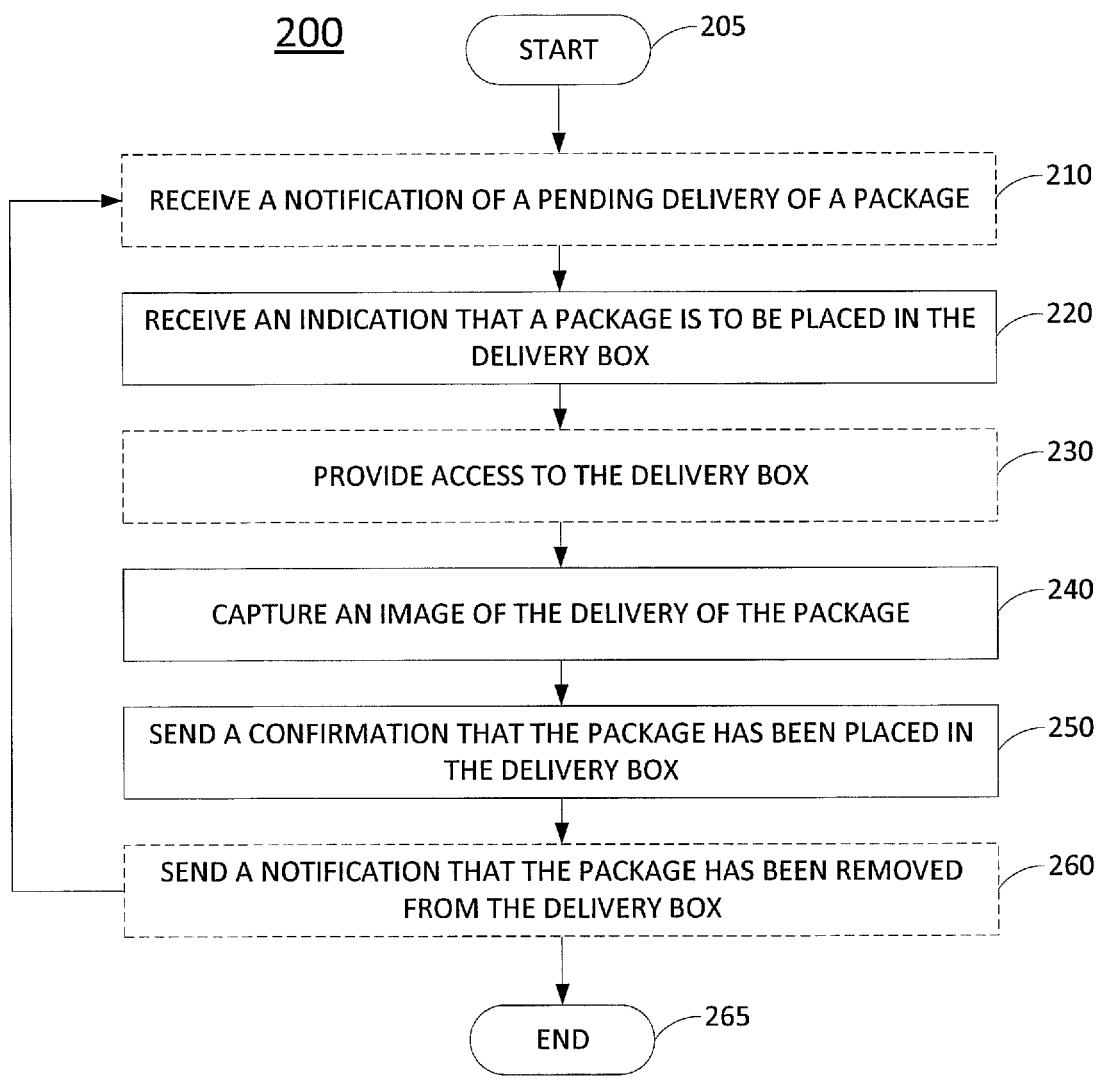
FIG. 2 illustrates a flowchart of a method for receiving a package into a delivery box.
Figure 4:
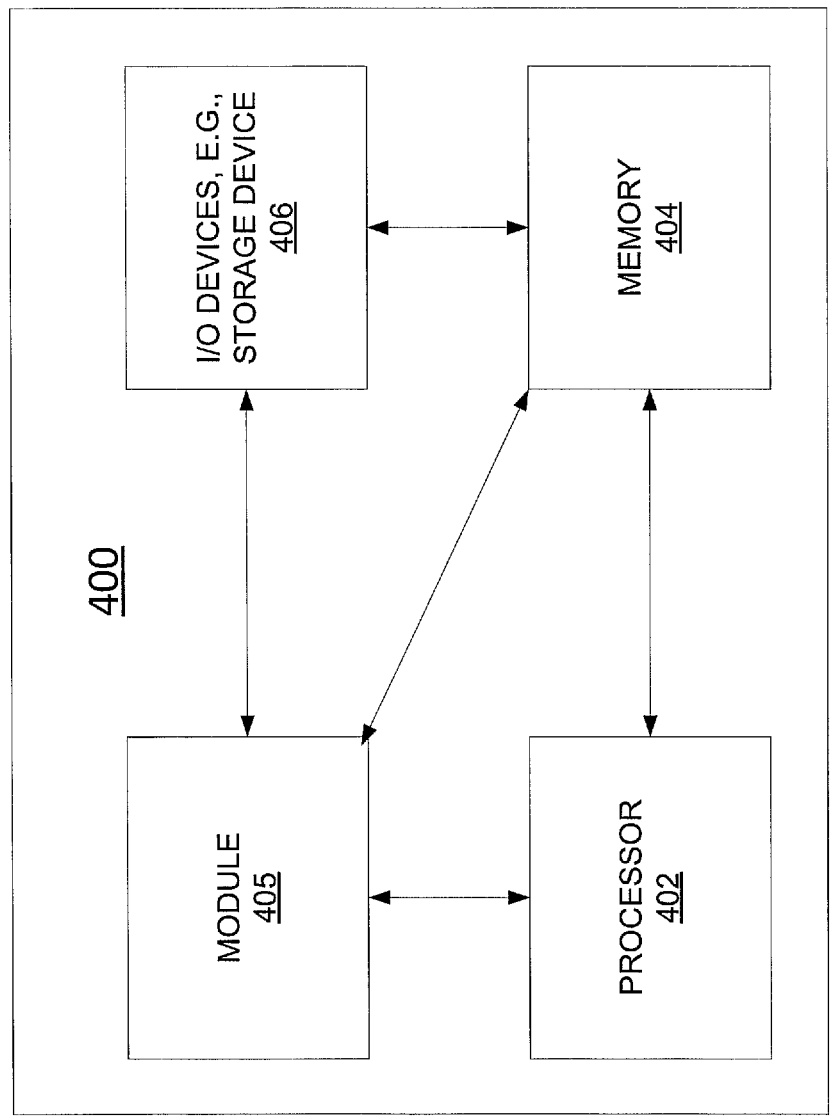
FIG. 4 illustrates a high-level block diagram of a dedicated computer suitable for use in performing the functions described herein.

FIG. 2 illustrates a flowchart of a method 200 for receiving a package into a delivery box 114. In one embodiment, the method 200 may be performed by the hardware processor 116 or a dedicated computer as illustrated in FIG. 4 and discussed below.

The method 200 begins at step 205. At optional step 210, the method 200 receives a notification of a pending delivery of a package. For example, a customer purchases a product from a retailer. In turn, the retailer may provide a verification back to the customer that the purchase has been confirmed, e.g., via an email message or a text message such as a Short Message Service (SMS) message and the like. In one embodiment, the notification may include a token or a code (broadly information) that is generated in response to the purchase of the product, e.g., the token or the code such a bar code or a QR code will be associated with the package (e.g., displayed on the exterior of the package), when it is delivered to the customer's residence. The notification may also include package tracking information such as the identity of the carrier or delivery service that is tasked with delivering the package, e.g., the U.S. Postal Service, United Parcel Service (UPS®), FedEx® service, and the like, an associated tracking number or code that is assigned to the package by the pertinent carrier, and an estimated delivery time and date. The package tracking information may further include a link in which the tracking number or code can be used to better track the current progress of the delivery of the package, e.g., the current location of the package. Thus, an estimated time and date of the delivery of the package can be deduced.

In one embodiment, the notification can be received by the processor 116 directly from the retailer 110. Alternatively, the notification can be received by the processor 116 from the customer, e.g., via the endpoint device 108 where the customer redirects the notification email to the processor 116. In yet another embodiment, the notification can be received by the processor 116 from the AS 104 of the network service provider if the customer has subscribed to a delivery notification service. There are various mechanisms that can be used to forward the notification to the processor 116. For example, the secure delivery box 114 can be assigned an email address, an IP address or a phone number for receiving such notification, e.g., via emails or text messages. The present disclosure is not limited by the manner in which the secure delivery box 114 receives such notification.

In one embodiment, step 210 can be an optional step. In other words, step 210 can be omitted such that the processor 116 is not provided with any advance notice of the delivery of the package.

In step 220, method 200 receives a notification that a package is to be placed in the delivery box 114. This notification can be received directly from the deliveryman 131. For example, the deliveryman 131 may depress a button 118 to indicate that he intends to deposit a package into the delivery box 114. Alternatively, the access door may have a sensor (e.g., a contact sensor) or a latch that will indicate that the access door is being opened or an attempt is being made to open the access door. Such attempt or actual opening of the access door can be interpreted as a notification that a package is to be placed in the delivery box 114. In yet another embodiment, the deliveryman 131 may present a code attached to the package to a scanner 118 deployed on the delivery box 114. Reading by the scanner 118 of such code can be interpreted as a notification that a package is to be placed in the delivery box 114.

In optional step 230, method 200 provides access to the delivery box 114, e.g., releasing a lock or a latch holding the access door in the closed position. For example, the access door on the delivery box 114 may be locked on a regular basis unless a pending delivery of a package is imminent. This allows the home owner to have control as to when the delivery box 114 can be accessed as a safety precaution, e.g., to address potential theft (e.g., another package may already reside within the delivery box), potential mischief (e.g., strangers dropping unwanted items into the delivery box), or even potential burglary of the customer's residence if the access door on the delivery box 114 may actually provide access to the customer's residence.

For example, in a first scenario, a deliveryman may contact the customer to indicate that he is currently at the customer's residence. The customer then sends a signal to the processor 116 which, in turn, will unlock the access door of the delivery box 114. In a second example, a deliveryman may simply scan the bar code of the package with a scanner deployed at the delivery box 114 and the processor 116 will then know that a delivery of a package is in progress and will unlock the access door of the delivery box 114. In a third example, a deliveryman may simply scan the bar code of the package with a scanner deployed at the delivery box 114 and the processor 116 will first match the scanned bar code with information (e.g., token or bar code information) received in step 210. Namely, in this scenario, the processor 116 will only provide access to the delivery box if the information from the scanned bar code matches stored information that was previously sent to the delivery box 114, e.g., from the retailer of the customer. This ensures that the delivery box 114 will only be opened to receive an "expected" package, which will serve as an additional security measure so that a thief will not be able to access the delivery box by simply presenting a bar code from another package. Finally, in one embodiment, step 230 can be an optional step that can be omitted, i.e., the access door to the delivery box 114 can be opened at any time.

In step 240, method 200 captures an image or a video (broadly a plurality of images) of the delivery of the package. For example, an image capturing device 118 may capture an image of the individual (presumably the deliveryman) depositing the package into the delivery box. Furthermore, the image capturing device 118 may also capture an image of the package residing within the delivery box 114 after the access door is closed and/or locked. This will ensure that the package was actually left inside the delivery box, e.g., to address the scenario where the deliveryman may access the delivery box as if he is depositing the package, but instead, walks away with the package.

In step 250, method 200 sends a confirmation that the package has been placed in the delivery box 114. For example, an email message or a text message (e.g., "package received") can be sent to the customer's endpoint device 108, to the AS 104, and/or to the retailer 110. In one embodiment, the confirmation may further include information pertaining to the package, e.g., the package tracking number, a date and time stamp associated with the delivery and the like. In another embodiment, the confirmation may further include an image or video of the delivery, e.g., a picture of the deliveryman, a picture of the package residing within the delivery box and so on.

In optional step 260, method 200 sends a notification that the package has been removed from the delivery box 114. For example, an email message or a text message (e.g., "package taken out of the delivery box") can be sent to the customer's endpoint device 108, to the AS 104, and/or to the retailer 110. In one embodiment, the notification may further include information pertaining to the package, e.g., the package tracking number, a date and time stamp associated with the package being taken out and the like. In another embodiment, the notification may further include an image or video of the act of removing the package from the delivery box 114, e.g., a picture of the customer, a picture of the package leaving the delivery box and so on.

In one embodiment, the customer is provided with a customer access code for retrieving the package from the delivery box. For example, the retailer may provide the customer with the customer access code after the purchase of a product has been confirmed, e.g., in the email or text message as described in step 210. Alternatively, the customer access code may comprise biometric data associated with the customer. The customer will then enter this customer access code (broadly interact with the delivery box if non-tactile communication is used, e.g., near field communication, presenting a code or an image from a mobile device to the delivery box, and so on) when retrieving the package from the delivery box. The delivery box 114 may then provide a confirmation back to the retailer that the individual who removed the package has also provided the customer access code. Thus, the present disclosure provides an end to end tracking of the package with secure delivery and secured retrieval by the recipient of the package. It should be noted that the customer access code can be implemented in various ways. For example, the customer access code can simply be a series of alphanumeric characters, a symbol, a bar code, a QR code, and the like. In fact, the customer access code may be biometric data associated with the customer, e.g., fingerprints, voiceprints, an image of an iris of the customer, and the like. Thus, in one embodiment the retailer does not actually provide the customer access code in the purchase confirmation message, but may instead define the type of biometric data that is required to be provided to the delivery box before retrieval of the package.

Step 260 is an optional step if the customer does not want such notification to be sent. However, in one embodiment, this step may be a required step dictated by the retailer who may want confirmation that the customer has taken possession of the package. Method 200 may then return to step 210 or end in step 265.

Figure 3:
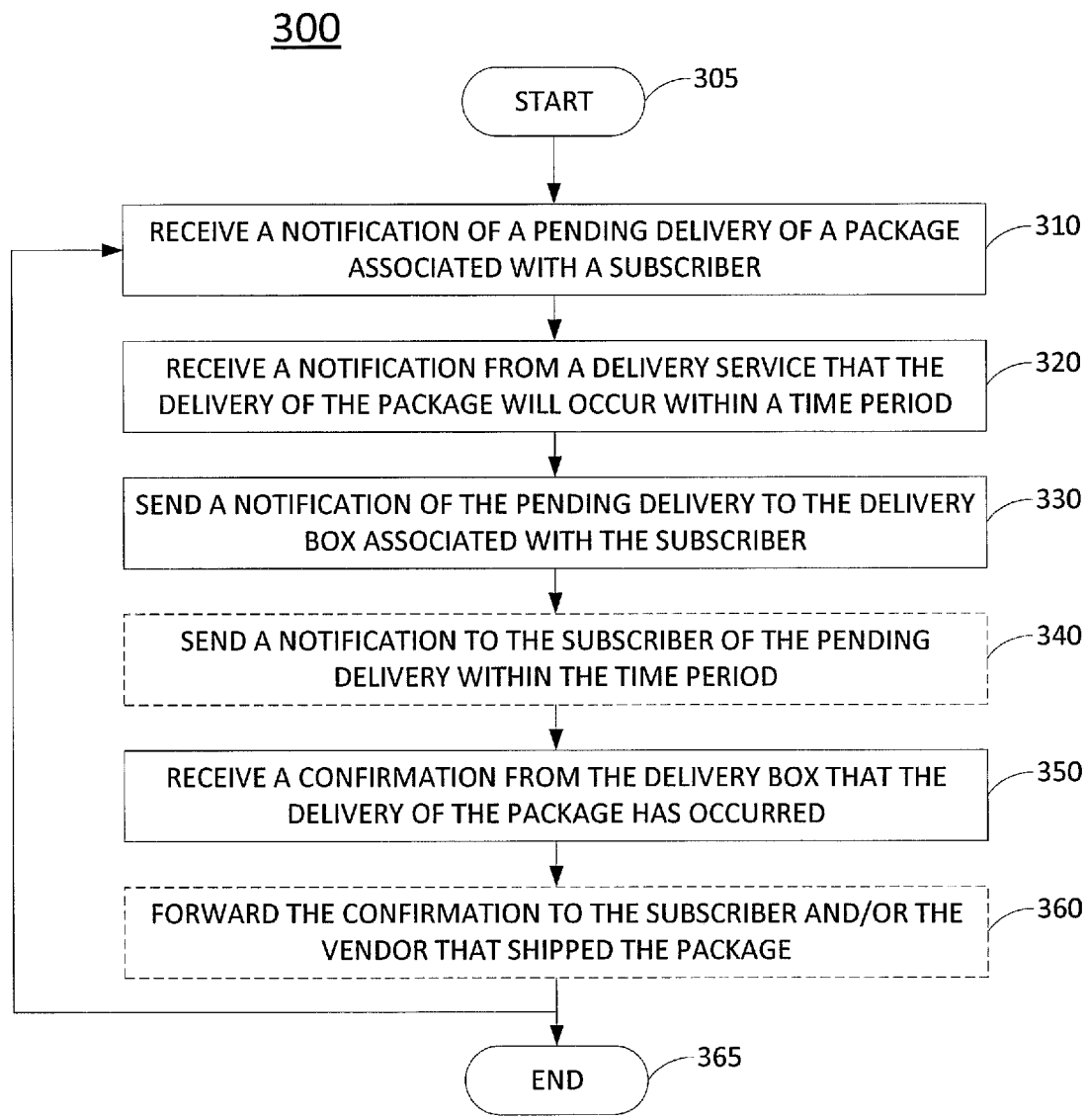
FIG. 3 illustrates a flowchart of a method for monitoring the receipt of a package into a delivery box.

FIG. 3 illustrates a flowchart of a method 300 for monitoring the receipt of a package into a delivery box 114. In one embodiment, the method 300 may be performed by the AS 104 or a dedicated computer as illustrated in FIG. 4 and discussed below.

The method 300 begins at step 305. In step 310, method 300 receives a notification of a pending delivery of a package associated with a subscriber. For example, a subscriber purchases a product from a retailer. In turn, the retailer may provide a verification back to the customer via the network service provider AS 104 that the purchase has been confirmed, e.g., via an email message or a text message such as a Short Message Service (SMS) message and the like. Namely, the subscriber may have a subscription for a delivery notification service with the network service provider.

In one embodiment, the notification may include a token or a code that is generated in response to the purchase of the product, e.g., the token or the code such a bar code or a QR code will be associated (e.g., displayed on the exterior of the package) with the package when it is delivered to the customer's residence. The notification may also include package tracking information such as the identity of the carrier or delivery service that is tasked with delivering the package, e.g., the U.S. Postal Service, United Parcel Service (UPS®), FedEx® service, and the like, an associated tracking number or code that is assigned to the package by the pertinent carrier, and an estimated delivery time and date. The package tracking information may further include a link in which the tracking number or code can be used to better track the current progress of the delivery of the package, e.g., the current location of the package. Thus, an estimated time and date of the delivery of the package can be deduced.

In one embodiment, the notification is received by the AS 104 directly from the retailer 110. There are various mechanisms that can be used to forward the notification to the AS 104. For example, the AS 104 can be assigned an email address, an IP address or a phone number for receiving such notification, e.g., via emails or text messages. The present disclosure is not limited by the manner in which the AS 104 receives such notification.

In step 320, the method 300 receives a notification from the delivery service, e.g., a carrier that the delivery of package will occur within a time period. For example, UPS may indicate that the delivery of the package will occur on Jan. 2, 2015 between 2-5 pm.

In step 330, the method 300 sends a notification to the delivery box 114 associated with the subscriber 109 after the notification from the delivery service is received. In other words, once AS 104 is provided with a delivery schedule, e.g., a date and a time, the AS 104 will notify the delivery box of the delivery schedule. The notification may include a token or a code associated with the package as discussed above so that the delivery box 114 can correlate such information with scanned information received from a scanner located at the delivery box 114 when the package is delivered.

In optional step 340, the method 300 sends a notification to the subscriber 109 after the notification from the delivery service is received. In other words, once AS 104 is provided with a delivery schedule, e.g., a date and a time, the AS 104 will notify the subscriber 109 of the delivery schedule.

In step 350, method 300 receives a confirmation that the package has been placed in the delivery box 114. For example, an email message or a text message (e.g., "package received") sent from the delivery box 114 is received by the AS 104. In one embodiment, the confirmation may further include information pertaining to the package, e.g., the package tracking number, a date and time stamp associated with the delivery and the like. In another embodiment, the confirmation may further include an image or video of the delivery, e.g., a picture of the deliveryman, a picture of the package residing within the delivery box and so on.

In optional step 360, method 300 sends the confirmation to the endpoint device 108 of the subscriber 109 or the retailer 110 that the package has been placed into the delivery box 114. For example, an email message or a text message (e.g., "package placed into the delivery box") can be sent to the subscriber's endpoint device 108 and/or to the retailer 110. In one embodiment, the confirmation may further include information pertaining to the package, e.g., the package tracking number, a date and time stamp associated with the package being placed inside the delivery box and the like. In another embodiment, the confirmation may further include an image or video of the act of placing the package into the delivery box 114, e.g., a picture of the deliveryman, a picture of the package residing inside the delivery box and so on. This is an optional step if the customer does not want such confirmation to be sent. However, in one embodiment, this step may be a required step dictated by the retailer who may want confirmation that the package has been delivered to the customer. Method 300 may then return to step 310 or end in step 365.

It should be noted that the embodiments of the present disclosure improve the technology of package delivery by allowing a network service provider and customers to be able to monitor and confirm the safe delivery or receipt of a package. This allows the network service provider and/or the customer to assist in deterring the thefts of delivered packages that are often left unattended at the customers' premises, thereby maintaining convenience for the customers while reducing losses suffered by retailers, carriers and/or insurance companies.

In addition, security of the customer's premises is also improved. The secure delivery box 114 eliminates the temptation of thieves who may be tempted to trespass onto private properties in the hope of finding and then stealing an unattended delivered package. Such behavior may lead to unanticipated confrontations where the safety of the customer or the customer's family may be put at risk.

Finally, there is also a novel transformation of purchase data and associated package tracking data into security data or control signals for the operation of a secure delivery box 114. Such transformation of the purchase data will improve the security of the customer's residence, e.g., proper operation and monitoring of the secure delivery box 114.

It should be noted that although not explicitly specified, one or more steps, functions, or operation of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIGS. 2 and 3 that recite a determining operation, or involve a decision, do not necessarily require that both branches of the determining operation be practiced. In other words, one of the branches of the determining operation can be deemed as an optional step.

FIG. 4 depicts a high-level block diagram of a computer suitable for use in performing the functions described herein. As depicted in FIG. 4, the system 400 comprises one or more hardware processor elements 402 e.g., a central processing unit (CPU), a microprocessor, or a multi-core processor), a memory 404, e.g., random access memory (RAM) and/or read only memory (ROM), a module 405 for ensuring and verifying the secure delivery of a package, and various input/output devices 406 (e.g., storage devices, including but not limited to, one or more buttons, an image capturing device, a scanner, a tape drive, a floppy drive, a hard disk drive or a compact disk drive, a receiver, a transmitter, a speaker, a display, a clock for providing date and time stamps, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for ensuring and verifying the secure delivery of a package (e.g., a software program comprising computer-executable instructions) can be loaded into memory 404 and executed by hardware processor element 402 to implement the steps, functions or operations as discussed above in connection with the exemplary methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for ensuring and verifying the secure delivery of a package (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for receiving a package, the method comprising:
receiving, by a processor of a delivery box having an enclosure accessed via an access door, a notification of a pending delivery of the package, wherein the delivery box is deployed on a property of a customer for exclusive use for the delivery of packages to the customer and is accessible to delivery services personnel, wherein the notification is received from a device of the customer;
receiving, by the processor, an indication that the package is to be placed into the delivery box, wherein the indication comprises information received by a scanner of the delivery box, wherein the notification of the pending delivery of the package is received prior to the receiving of the indication;
determining, by the processor, whether the information received by the scanner matches information provided in the notification of the pending delivery of the package;

providing, by the processor, access to the enclosure of the delivery box via the access door when the information received by the scanner matches the information provided in the notification of the pending delivery of the package;

capturing, by the processor, in response to the access door of the delivery box being closed and locked, an image of delivery of the package, wherein the image comprises an image of the package residing within the delivery box;

sending, by the processor, a confirmation that the package has been placed into the delivery box, wherein the confirmation comprises the image of delivery of the package;

obtaining, by the processor from a retailer that sent the package, a customer access code to be used to access the delivery box;

receiving, by the processor, an input of the customer access code to access the delivery box;

capturing, by the processor in response to the input of the customer access code, an image of an act of removing the package from the delivery box; and sending, by the processor, to the retailer that sent the package, a notification that the package has been removed from the delivery box, wherein the notification that the package has been removed from the delivery box comprises the customer access code provided by the retailer to the customer to be used to access the delivery box and the image of the act of removing the package from the delivery box.

2. The method of claim 1, wherein the confirmation is sent to an endpoint device of the customer.

3. The method of claim 1, wherein the confirmation is sent to the retailer that sent the package.

4. The method of claim 1, wherein the confirmation is sent to an application server that provides a delivery notification service.

5. The method of claim 1, wherein the confirmation further comprises a date and time in which the package was placed inside the delivery box.

6. The method of claim 1, wherein the notification that the package has been removed from the delivery box further comprises a date and time in which the package was removed from the delivery box.

7. The method of claim 1, wherein the processor is configured to deny the access to the enclosure of the delivery box via the access door when the information received by the scanner does not match the information provided in the notification of the pending delivery of the package.

8. A delivery box, comprising:
an enclosure with an access door;
a processor; and
a computer-readable medium storing a plurality of instructions which, when executed by the processor, cause the processor to perform operations, the operations comprising:
receiving a notification of a pending delivery of a package, when the delivery box is deployed on a property of a customer for exclusive use in the delivery of packages to the customer and is accessible to delivery services personnel, wherein the notification is received from a device of the customer;
receiving an indication that a package is to be placed into the delivery box, wherein the indication comprises information received by a scanner of the delivery box, wherein the notification of the pending delivery of the package is received prior to the receiving of the indication;

determining whether the information received by the scanner matches information provided in the notification of the pending delivery of the package;

providing access to the enclosure of the delivery box via the access door when the information received by the scanner matches the information provided in the notification of the pending delivery of the package;

capturing, in response to the access door of the delivery box being closed and locked, an image of delivery of the package, wherein the image comprises an image of the package residing within the delivery box;

sending a confirmation that the package has been placed into the delivery box, wherein the confirmation comprises the image of delivery of the package;

obtaining, from a retailer that sent the package, a customer access code to be used to access the delivery box;

receiving an input of the customer access code to access the delivery box;

capturing, in response to the input of the customer access code, an image of an act of removing the package from the delivery box; and sending, to a retailer that sent the package, a notification that the package has been removed from the delivery box, wherein the notification that the package has been removed from the delivery box comprises the customer access code provided by the retailer to the customer to be used to access the delivery box and the image of the act of removing the package from the delivery box.

9. The delivery box of claim 8, wherein the confirmation is sent to the retailer that sent the package.

10. A method for monitoring a delivery of a package, the method comprising:

receiving, by a processor of an application server of a communication network service provider, a first notification of the delivery of the package associated with a customer from a retailer to a delivery service;

receiving, by the processor of the application server of the service provider, a second notification from the delivery service of a delivery schedule of the package;

sending, by the processor of the application server of the communication network service provider, in response to the receiving the second notification, a third notification comprising the delivery schedule to a delivery box associated with the customer, wherein the delivery box is deployed on a property of the customer for exclusive use in the delivery of packages to the customer and is accessible to delivery services personnel;

receiving, by the processor of the application server of the communication network service provider, in response to the package being placed into the delivery box and an access door of the delivery box being closed and locked, a confirmation from the delivery box, wherein the confirmation comprises an image of the package residing within the delivery box;

receiving, by the processor of the application server of the communication network service provider, a fourth notification that the package has been removed from the delivery box using a customer access code provided by the retailer to the customer to be used to access the delivery box, wherein the fourth notification comprises the customer access code provided by the retailer to the customer to be used to access the delivery box and an image of an act of removing the package from the delivery box; and sending, by the processor of the application server of the communication network service provider to the retailer that sent the package, in response to the receiving the fourth notification, the fourth notification that the package has been removed from the delivery box.

11. The delivery box of claim 8, wherein the plurality of instructions are further to cause the processor to deny the access to the enclosure of the delivery box via the access door when the information received by the scanner does not match the information provided in the notification of the pending delivery of the package.

12. The delivery box of claim 8, wherein the confirmation is sent to an application server that provides a delivery notification service.

13. The delivery box of claim 8, wherein the confirmation further comprises a date and time in which the package was placed inside the delivery box.

14. The delivery box of claim 8, wherein the notification that the package has been removed from the delivery box comprises a date and time in which the package was removed from the delivery box.

15. The delivery box of claim 8, wherein the confirmation is sent to an endpoint device of the customer.

\* \* \* \* \*